(12) United States Patent
Amici

(10) Patent No.: US 7,728,070 B2
(45) Date of Patent: Jun. 1, 2010

(54) METHOD OF PRODUCING FINE PARTICLES

(75) Inventor: Eleonora Amici, East Cowes (GB)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 11/989,278

(22) PCT Filed: Jul. 20, 2006

(86) PCT No.: PCT/EP2006/007162

§ 371 (c)(1),
(2), (4) Date: Jul. 7, 2008

(87) PCT Pub. No.: WO2007/028457

PCT Pub. Date: Mar. 15, 2007

(65) Prior Publication Data

US 2009/0149597 A1    Jun. 11, 2009

(30) Foreign Application Priority Data

Jul. 25, 2005    (EP)    ................... 05254621

(51) Int. Cl.
*C08B 37/00*    (2006.01)
*A23C 9/14*    (2006.01)

(52) U.S. Cl. ...................................... 525/54.3; 426/271

(58) Field of Classification Search ................. 426/271; 525/54.3

See application file for complete search history.

(56) References Cited

U.S. PATENT DOCUMENTS 2,441,729 A    12/1943    Steiner

FOREIGN PATENT DOCUMENTS

| EP | 213 303 B1 | 6/1986 |
| EP | 380 254 B1 | 1/1990 |
| EP | 1 358 931 A2 | 4/2003 |

OTHER PUBLICATIONS

Sugiura et al., JAOCS 79, 515-519 (May 2002).*

* cited by examiner

*Primary Examiner*—Ling-Siu Choi
*Assistant Examiner*—Sonya Wright
(74) *Attorney, Agent, or Firm*—Michael P. Aronson

(57) ABSTRACT

A method of producing cross-linked polymerisation hardened droplets in a continuous aqueous medium in a microchannel device is provided. At least two aqueous streams are brought together before entering a hydrophobic phase and thus forming droplets. One aqueous phase comprises an acid source and another comprises a metal ion salt. The slow release of metal ions slows down the rate of polymerisation so that it does not interfere with the droplet formation process.

7 Claims, 1 Drawing Sheet

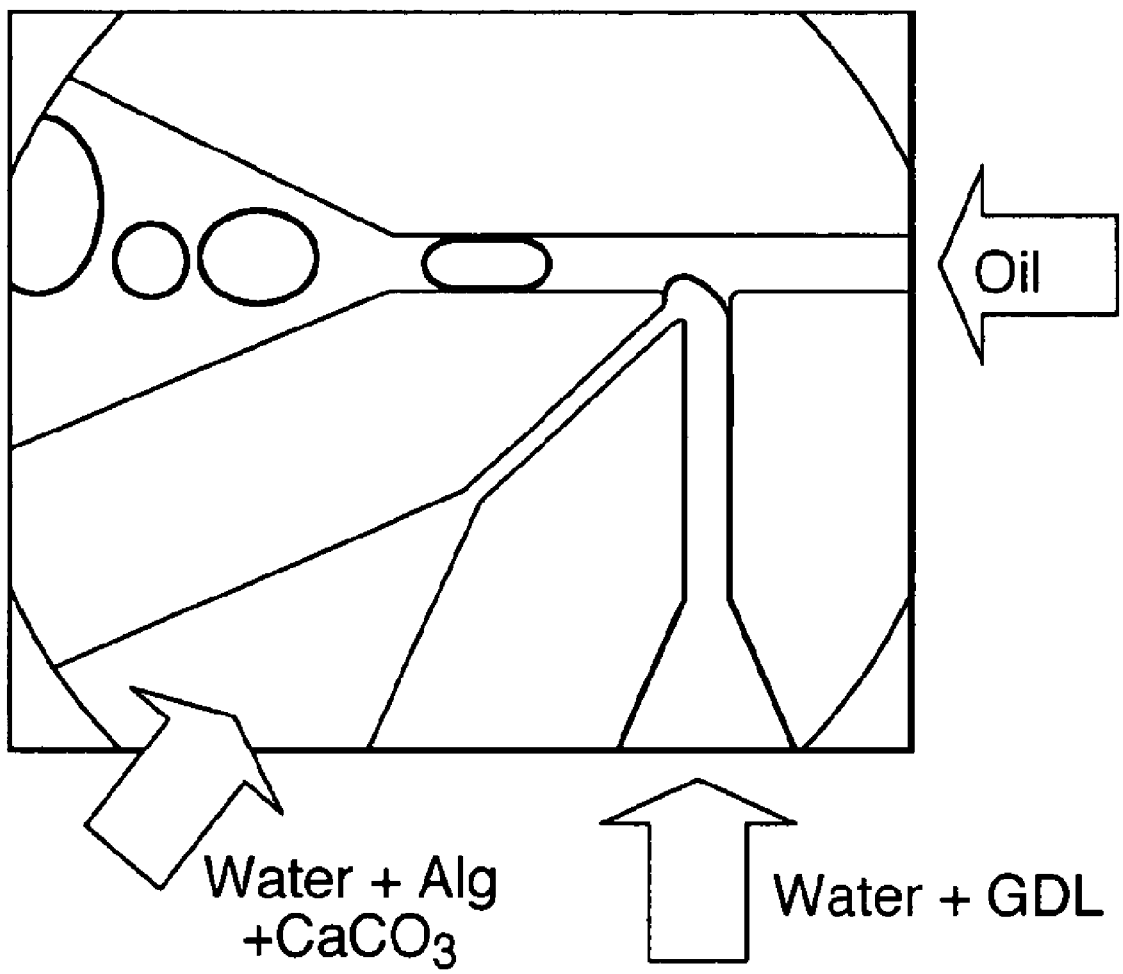

METHOD OF PRODUCING FINE PARTICLES

The present invention relates to a process for making fine particles from a microchannel device. More particularly it relates to a process for forming cross-linked polymerisation hardened droplets with good uniformity in size on the micron scale.

BACKGROUND AND PRIOR ART

Microchannel devices are well known in the art and are especially suitable for forming multiphase materials such as emulsions. Microchannel devices operate on the micron scale and so surface forces become an important factor when attempting to use them to prepare such multiphase materials. In particular it is challenging to generate droplets of one fluid in another and maintain consistency in droplet size.

EP-A-1 358 931 (Tosoh Corporation) discloses a microchannel device which is suitable for generating particles of consistent size in a carrier fluid. This discloses the simple Y-shaped geometry and solves the problem by control of the flow rates of the materials used. It also discloses that the generate droplets may be hardened by cross-linking polymerisation, UV curing or by thermal gelling. However, only examples disclosing UV or thermal gelling are specifically disclosed.

For some applications, especially in the foods industry, droplets which harden by cross-linked polymerisaton may be desirable. However, this form of hardening causes difficulties when trying to manufacture uniform polymerised droplets in a carrier medium. One method is to bring an aqueous stream containing the biopolymer sol and an aqueous stream comprising the gelling agent together, so that the biopolymer forms droplets in the gelling agent stream. However because the rate of polymerisation is faster than time for droplet formation this usually results in the gelling process starting even before the droplets are formed, thus giving non-uniform particles or blocking. One way of decoupling the processes of gelation and droplet formation would be to form droplets of the biopolymer sol in a hydrophobic carrier fluid such as an oil. In this arrangement the metal ion which triggers the polymerisation gelling could then be introduced after droplet formation. However a problem with this approach is that metal ions are not very soluble in oil and tend to aggregate together and are prevented from initiating polymerisation.

Therefore it is an aim of the present invention to provide a method of producing cross-linked hardened gel particles on the micron scale which have good consistency in droplet size.

Thus, the present invention provides a method of producing cross-linked polymerisation hardened droplets in a continuous aqueous medium in a microchannel device, comprising feeding a first aqueous stream comprising a source of metal ion salt, a second aqueous stream comprising a source of acidity and a third hydrophobic stream, wherein an aqueous stream comprises a biopolymer and the aqueous streams merge into each other before or at the same time as they meet the hydrophobic stream, thereby forming aqueous droplets which subsequently harden by cross-linked polymerisation by generation of metal ions.

DETAILED DESCRIPTION OF THE INVENTION

The Process

In the present invention at least two aqueous streams merge together and then immediately or subsequently merge with a hydrophobic stream which results in aqueous droplets being formed. One of the aqueous streams comprises a source of acidity and another aqueous stream comprises a metal ion salt. Additionally, one of the aqueous streams contains a biopolymer in solution. The biopolymer may be present in the add stream and/or in the salt stream, or even in a third aqueous stream. Once the aqueous streams merge, the source of acidity lowers the pH environment of the metal ion salt which causes an increase in the concentration of dissociated metal ions in solution. The timescale of this reaction is comparable to the timescale of the formation time of the droplets and with suitable choice of relative flow rates, permits the two processes to be decoupled. Therefore it is preferred that the aqueous streams merge immediately prior to merging with the hydrophobic stream so that the cross-linking polymerisation process does not interfere with the droplet formation step.

Thus for example, liquid droplets can be formed into spheres which have good consistency in size and shape.

Even with the lengthened timescale of hardening, it is possible for it to interfere with the droplet formation step, however this can be solved by simply increasing the flow rate of the hydrophobic stream with respect to the combined flow rate of the aqueous streams. The exact ratio of flow rates where the hardening process no longer interferes with the droplet formation process will be dependent upon many factors, which the skilled person will be aware of, such as geometry, interfacial tensions, viscosities etc.

Each of the aqueous phases may additionally contain dispersed particles or even dispersed droplets of hydrophobic liquid. In the latter case it may then be possible to have droplets of hydrophobic encased in a cross-linked hardened shell.

This process occurs in a microchannel arrangement. Therein the dimensions of the channels are less than 1 mm diameter. Preferably the channels are from 5 to 500 micrometers in diameter.

The Metal Ion Salt

The metal ion whose salt is in one of the aqueous streams triggers the cross-linking polymerisation process in the biopolymer. The metal ion is preferably selected from sodium, calcium, potassium, magnesium, rubidium, caesium. Preferably it is calcium. Preferably the metal ion salt is selected from $CaCo_3$, $Ca_3(PO_4)_2$, $CaSO_4$, CaEDTA or CaEGTA.

In order to slow down the metal ion generation rate, the metal ion salt is preferably in the form of dispersed particles having an average particle size of from 0.5 to 20 microns. The larger the particles the slower the rate of metal ion generation due to the reduced surface area.

The Biopolymer

The biopolymer undergoes cross-linked polymerisation when it is exposed to the metal ion. Suitably the biopolymer is selected from alginate, pectin, carrageenan and gellan. Preferably the biopolymer is alginate or pectin.

The Source of Acidity

The source of acidity may be in the form of an organic or inorganic add. However, weak adds are preferred in order that the supply of protons is less plentiful which can slow down the metal ion generation rate. One preferred weak add is citric add.

The source of acidity is preferably glucono-lactone because it hydrolyses and releases protons on an appropriate timescale and is suitable for use in foodstuffs.

The Hydrophobic Stream

The aqueous stream merges with the hydrophobic stream and the aqueous stream breaks up into droplets carried by the hydrophobic stream. This is ensured by careful control of the relative flow rates of the two streams. Preferably the hydrophobic stream is an oil stream.

Decoupling

In a simple situation, the cross-linking polymerisation will begin once the concentration of metal ions reaches some critical value, Mc. Whereas we may state that the rate of increase in the concentration of metal ions is R. Therefore the time taken to reach Mc assuming zero concentration initially is Mc/R.

In order for the processes of gel formation and drop formation to be decoupled this time must be greater than the time take to form a droplet. The time taken to form a droplet is the inverse of the droplet frequency and is therefore given by Vd/Qd, where Vd is the droplet volume and Qd is the total mass flow rate of the aqueous phases. If the aqueous phases merge before reaching the hydrophobic phase then this lag time, t, effectively acts so as to constrain the system further by increasing the effective droplet formation time. Thus, in order for the processes of droplet formation and gelation to be decoupled, the following inequality must be satisfied:

$$Mc/R > Vd/Qd + t \quad (1)$$

In practice it is difficult to predict a priori whether this inequality will be satisfied. This is primarily because of the large number of influences on the various parameters. However, for a given geometry and set of materials, a skilled person can simply alter the flow rates of the aqueous streams and hydrophobic streams until it is satisfied as demonstrated by an uninterrupted drop formation stage as demonstrated in the examples.

BRIEF DESCRIPTION OF THE DRAWING

FIG. 1 shows droplets of alginate forming which subsequently harden. To construct the apparatus micro-channels were fabricated in PDMS using standard "soft lithography" methods. The channel cross sections dose to the junction are 100*100 um (oil, water+GDL) and 100*30 um (water+alg+CaCO3)

EXAMPLES

Example 1

Aqueous stream 1: Water+alginate (0.9% w/w)+NaCl (50 mM)+$CaCO_3$ (21.6 mM, 5☐m crystals)

Aqueous stream 2: Water+GDL (129.6 mM)

Oil stream: sunflower oil (no surfactant)

$Q_{aqueous}$ is the sum of the flow rates of both aqueous streams: $Q_{aqueous} = Q_1 + Q_2$ The ratio $Q_1/Q_2$ is maintained throughout at $Q_1/Q_2 = 3:1$ Final concentration of alginate in the drops: 0.675% w/w

TABLE 1

Drop formation time for the system described. The subscript g indicates where gelation is seen to interfere with the drop formation event.

| $Q_{oil}$ [ml/hr] | $Q_{aqueous}$ [ml/hr] | | | |
|---|---|---|---|---|
| | 0.1 | 0.16 | 0.24 | 0.32 |
| 0.18 | | 0.057 g | | 0.064 g |
| 0.24 | | 0.038 g | | 0.035 g |
| 0.32 | 0.063 g | 0.039 g | 0.033 | 0.025 |
| 0.43 | 0.041 g | 0.041 g | 0.025 | 0.024 |
| 0.56 | 0.035 g | 0.031 | 0.024 | 0.018 |
| 0.74 | 0.031 | 0.020 | 0.018 | |

Table above shows the drop formation time experimentally determined (here defined as the inverse of the drop formation frequency, i.e. the time between two drop formation events). In this case, for long formation times one sees that gelation interferes with the drop formation event. When formation time is faster, the droplet formation event proceeds unhindered and gelation only occurs after the drop formation event is completed.

Similar results were obtained when the source of acidity is added to the alginate and the metal ion salt is carried by a viscous aqueous stream. More precisely similar results were obtained when the composition of the aqueous streams was:

Aqueous stream 1: Water+alginate (0.9% w/w)+NaCl (50 mM)+GDL (43.3 mM)

Aqueous stream 2: Water+Guar Gum 0.375% (w/w)+$CaCO_3$ (64.8 mM, 5☐m crystals)

Oil stream: sunflower oil (no surfactant)

$Q_{aqueous}$ is the sum of the flow rates of both aqueous streams: $Q_{aqueous} = Q_1 + Q_2$ The ratio $Q_1/Q_2$ is maintained throughout at $Q_1/Q_2 = 3:1$ Final concentration of alginate in the drops: 0.675% w/w Example 2

Aqueous stream 1: Water+alginate (0.9% w/w)+NaCl (50 mM)+$CaCO_3$ (21.6 mM, 5☐m crystals)

Aqueous stream 2: Water+GDL (43.2 mM)

Oil stream: sunflower oil (no surfactant)

$Q_{aqueous}$ is the sum of the flow rates of both aqueous streams: $Q_{aqueous} = Q_1 + Q_2$ The ratio $Q_1/Q_2$ is maintained throughout at $Q_1/Q_2 = 1:1$ Final concentration of alginate in the drops: 0.45% w/w In this case droplet formation time are roughly equal to those observed in case 1. As the gel formed is much weaker than in case 1, no serious interference between drop formation and gel formation is observed. However, the final gel is so weak that it is almost "liquid".

The invention claimed is:

1. A method of producing aqueous cross-linked polymerization hardened droplets carried by a hydrophobic stream in a microchannel device, comprising feeding a first aqueous stream having a volumetric flow rate $Q_1$ comprising a source of metal ion salt, a second aqueous stream having a volumetric flow rate $Q_2$ comprising a source of acidity and a third hydrophobic stream having a volumetric flow rate $Q_{oil}$, wherein a biopolymer is in one of the aqueous streams and the aqueous streams merge into each other before or at the same time as they meet the hydrophobic stream, thereby forming aqueous droplets which subsequently harden by cross-linked polymerization by generation of metal ions and wherein the flow rates $Q_1$, $Q_2$, and $Q_{oil}$ are chosen such that droplet formation proceeds un-hindered and gelation only occurs after drop formation is completed thereby decoupling the process of droplet formation and gelation.

2. A method as claimed in claim 1, wherein the metal ion in the salt is selected from sodium, calcium, potassium, magnesium, rubidium, caesium.

3. A method as claimed in claim 2, wherein the metal ion in the salt is calcium.

4. A method as claimed in claim 3, wherein the metal ion salt is selected from the group consisting of $CaCo_3$, $Ca_3(PO_4)_2$, $CaSO_4$, CaEDTA or CaEGTA.

5. A method as claimed in claim 1, wherein the metal ion salt is in the form of dispersed particles having a mean particle size in the range of from 0.5 to 20 microns.

6. A method as claimed in claim 1 wherein the biopolymer is alginate or pectin.

7. A method as claimed in claim 1, wherein the source of acidity is glucono-δ-lactone.

* * * * *